(12) United States Patent
Khylenko (10) Patent No.: US 11,552,789 B2
(45) Date of Patent: Jan. 10, 2023

(54) SYSTEM FOR AN ENCODED INFORMATION TRANSMISSION

(71) Applicant: Volodymyr Vasiliovich Khylenko, Kiev (UA)

(72) Inventor: Volodymyr Vasiliovich Khylenko, Kiev (UA)

(73) Assignee: Volodymyr Vasiliovich Khylenko, Kiev (UA)

( * ) Notice: Subject to any disclaimer, the term of this patent is extended or adjusted under 35 U.S.C. 154(b) by 104 days.

(21) Appl. No.: 17/146,094

(22) Filed: Jan. 11, 2021

(65) Prior Publication Data
US 2021/0377011 A1   Dec. 2, 2021

(30) Foreign Application Priority Data

May 27, 2020   (UA) .............................. a 202003199

(51) Int. Cl.
*H04L 9/08*   (2006.01)
*H04L 9/14*   (2006.01)

(52) U.S. Cl.
CPC .......... *H04L 9/0827* (2013.01); *H04L 9/0861* (2013.01); *H04L 9/0891* (2013.01); *H04L 9/14* (2013.01)

(58) Field of Classification Search
CPC ... H04L 9/0827; H04L 9/0891; H04L 9/0861; H04L 9/002; H04L 9/14; H04L 9/12; H04L 2209/80
See application file for complete search history.

(56) References Cited

U.S. PATENT DOCUMENTS

| 8,902,318 B1* | 12/2014 | Haddad | H04N 5/23245 |
| | | | 348/222.1 |
| 10,104,342 B2* | 10/2018 | Nanda | H04N 21/4627 |
| 2002/0183005 A1* | 12/2002 | Yl | H04M 1/72502 |
| | | | 455/410 |
| 2003/0219119 A1* | 11/2003 | Kocarev | H04L 9/0861 |
| | | | 380/28 |

(Continued)

FOREIGN PATENT DOCUMENTS

WO   2017146669 A1   8/2017

*Primary Examiner* — Mohammad A Siddiqi
(74) *Attorney, Agent, or Firm* — DeLio Peterson & Curcio LLC; Kelly M Nowak (57) ABSTRACT

The invention relates to a system for transmitting encoded information over radio channels and wired communication lines, including the Internet. The system includes a transmitting side and a receiving side each comprising various software/hardware modules for generating/displaying the output/received information of the transmitting side, cryptographic calculations of the transmitting side, service information of the transmitting side, a module for generating a set key of the transmitting side, a module for generating a computed key of the transmitting/receiving side, a module of transmitting side communication channel, macroblocks for blocking computer brute-force search including at least three software/hardware modules for information encoding/ cryptographic transformations, a module for random numbers generation, and modules for a degree of the setting polynomial. These modules of the transmitting and receiving sides are connected to each other within their respective sides, as well as to each other across a communication channel.

1 Claim, 2 Drawing Sheets

A system for an encoded information transmission.

(56) References Cited

U.S. PATENT DOCUMENTS

| | | | |
|---|---|---|---|
| 2013/0117392 A1* | 5/2013 | Aceves | H04L 51/23 709/206 |
| 2015/0067875 A1* | 3/2015 | Johnson | H04L 9/0631 726/26 |
| 2016/0142202 A1* | 5/2016 | Dai Zovi | G06F 21/84 380/28 |
| 2019/0089529 A1* | 3/2019 | Conway | H04L 9/0819 |

* cited by examiner

FIG. 2

SYSTEM FOR AN ENCODED INFORMATION TRANSMISSION

BACKGROUND OF THE INVENTION

Field of the Invention

The present invention relates to electric communications and more specifically to a system for transmitting encoded information over radio channels and wired communication lines, including the Internet. The invention may be used in systems for transmitting encrypted information for receiving and transmitting confidential information (messages) with the possibility of providing increased protection against unauthorized decoding by an unauthorized user also in case when such unauthorized user utilizes computers (computer facilities) of ultra-high performance.

SUMMARY OF THE INVENTION

By a number of essential features, the closest analogue to the proposed system is a system for transmitting encoded information, said system comprising a transmitting side and a receiving side, wherein the transmitting side comprises modules for: generating/displaying the output/received information of the transmitting side, cryptographic Calculations of the transmitting side, service information of the transmitting side, a module for generating a set key of the transmitting side; a module for generating a computed key of the transmitting/receiving side, and a module of transmitting side communication channel, and the receiving side comprises modules for: generating/displaying the transmitted/received information of the receiving side, cryptographic calculations of the receiving side, service information of the receiving side; a module for generating a set key of the receiving side, a module for generating a computed key of the transmitting/receiving side, and a module of receiving side communication channel [International application for an invention PCT/UA 2016/000064 of May 25, 2016; Publication WO/2017/146669, Publication date Aug. 31, 2017].

BRIEF DESCRIPTION OF THE DRAWINGS

The essence of the provided invention is explained with reference to block diagrams of the device shown in FIGS. 1 and 2.

DESCRIPTION OF THE PREFERRED EMBODIMENT(S)

In the described system, for protection of the transmitted/received information from unauthorized encoding/decoding, two modules are used simultaneously to generate independent secret keys based on matrix transformations, which are correlated in the decoding procedure in such a manner that when they are used together to decode information in case of attempt to get unauthorized access to the system such unauthorized user will experience the need in a double exponential increase in amount of computations.

The described system for transmitting confidential information has a fairly high degree of protection against unauthorized decoding, because, in order to access confidential information, an unauthorized user needs to perform significantly increased amount of computations and spend much more time compared to the time spent by an authorized user. This is due to the fact that when attempting unauthorized decoding, an unauthorized user must perform certain operations, in particular, perform multiple brute-force search of possible combinations in order to determine the combinations that could be used by the authorized user for encoding information. However, at present, the protection of the described system against unauthorized decoding is insufficient due to launching of more advanced computing systems, allowing to significantly (by tens of times) accelerate the process of computing/multiple brute-force searches of possible combinations, which, in turn, allows unauthorized user to speed up decoding process for information, being transmitted in the described system, and decode it within a reasonable time.

Therefore, the present invention is aimed to provide a system for transmitting confidential information, which would significantly complicate the process of unauthorized decoding of transmitted information, even if an unauthorized user possesses and uses ultra-high performance computing systems for unauthorized decoding. This problem is solved by creating conditions for failure (looping) in a computer system operation, when attempting to perform unauthorized decoding of a transmitted confidential information.

Like the system of the state of the art, the system for transmitting encoded information according to the invention comprises a transmitting side and a receiving side, wherein the transmitting side comprises modules for: generating/displaying the output/received information of the transmitting side, cryptographic calculations of the transmitting side, service information of the transmitting side; and a module of transmitting side communication channel, and the receiving side comprises a module for: generating/displaying the output/received information of the receiving side, cryptographic calculations of the receiving side, service information of the receiving side; and a module of receiving side communication channel, and, according to the invention, at the transmitting side and the receiving side the system additionally comprises macroblocks for blocking computer brute-force search (MBS), respectively, of the transmitting side and the receiving side, each of said macroblocks is designed, respectively, to define and solve the problem of determining the eigenvalues of matrices used in encoding and decoding process (iterative cascading interrelated encoding/decoding of information using encoding key(s) representing elements of fuzzy sets), for example, by way of numerical integration of systems of differential equations corresponding to the matrices used in blocks of cryptographic calculations, and correlation of information signals, being transmitted to the communication channel, taking into account the results of calculations, and each of the macroblocks comprises at least three modules for information encoding—cryptographic transformations (MBC1, MBC2, MBC3), a random number generator (RNG), and a module for inputting a degree of the setting polynomial, wherein, at the transmitting side, the first input and output of the module for generating/displaying the output/received information of the transmitting side (MDO) are connected to the first input and the first output of the first module for cryptographic transformations (MBC1), which is a part of the macroblock for blocking computer brute-force search of the transmitting side (MBS), the second output of the module for generating/displaying the output/received information of the transmitting side (MDO) is connected to the input of the module for inputting a degree of the setting polynomial (MIDP), the output of the latter module being connected to the input of the service information module (MSI), the second output and the fifth input of the first module for cryptographic transformations (MBC1), which is a part of the macroblock for blocking computer brute-force search of the transmitting side (MBS), are connected to the first input/output of the second module for cryptographic transformations (MBC2), which is a part of the macroblock for blocking computer brute-force search of the transmitting side (MBS), the third, fourth and sixth outputs of the first module for cryptographic transformations (MBC1), which is a part of the macroblock for blocking computer brute-force search of the transmitting side (MBS), are connected, respectively, to the first outputs of the third module for cryptographic transformations (MBC3), the random number generator (RNG), and an additional module for information encoding (MBC4), which is a part of the macroblock for blocking computer brute-force search of the transmitting side (MBS), the second and third outputs of the random number generator (RNG) are connected, respectively, to the first and second inputs of the third (MBC3) and second (MBC2) modules of cryptographic transformations, which are the parts of the macroblock for blocking computer brute-force search of the transmitting side (MBS), and the second input/output of the third module for cryptographic transformations (MBC3), which is a part of the macroblock for blocking computer brute-force search of the transmitting side (MBS), are connected to the second output and the third input of the second module for cryptographic transformations (MBC2), which is a part of the macroblock for blocking computer brute-force search of the transmitting side (MBS), the first output of the service information module (MSI) is connected to the input of the module for generating a set key of the transmitting side (MK1), the output of the latter module being connected to the second input of the first module for cryptographic transformations (MBC1), which is a part of the macroblock for blocking computer brute-force search of the transmitting side (MBS), the second output of the service information module (MSI) is connected to the input of the module for generating a computed key of the transmitting/receiving side, where the first output of said module is connected to the fourth input of the module for cryptographic transformations (MBC2), which is a part of the macroblock for blocking computer brute-force search of the transmitting side (MBS), the third output of said macroblock is connected to the second output of the module for generating a computed key of the transmitting/receiving side (MK2), the first input/output of the module for cryptographic calculations (MCC) of the transmitting side are connected, respectively, to the fifth input and the fourth output of the second module for cryptographic transformations (MBC2), which is a part of the macroblock for blocking computer brute-force search of the transmitting side (MBS), the second input/output of the computer computing module (MCC) are connected, respectively, to the first input/output of the communication channel unit of the transmitting side (CC), the second input/output of said unit being intended for connection to the receiving side via the communication channel (CC), and at the receiving side the first input/output of the module for generating/displaying the output/received information of the receiving side is connected to the first input and the first output of the first module for cryptographic transformations (MBC1), which is a part of the macroblock for blocking computer brute-force search of the receiving side (MBS), the second output of the module for generating/displaying the output/received information of the transmitting side (MDO) is connected to the input of the module for inputting a degree of the setting polynomial (MIDP), the output of the latter module being connected to the input of the service information module (MSI), the second output and the fifth input of the first module for cryptographic transformations (MBC1), which is a part of the macroblock for blocking computer brute-force search of the receiving side (MBS), are connected to the first input/output of the second module for cryptographic transformations (MBC2), which is a part of the macroblock for blocking computer brute-force search of the receiving side (MBS), the third, fourth and sixth inputs of the first module for cryptographic transformations (MBC1), which is a part of the macroblock for blocking computer brute-force search of the receiving side (MBS), are connected, respectively, to the first outputs of the third module for cryptographic transformations (MBC3), random number generator (RNG), and an additional module for information encoding (MBC4), which is a part of the macroblock for blocking computer brute-force search of the receiving side (MBS), the second and the third outputs of the random number generator (RNG) are connected, respectively, to the first and the second inputs of the third (MBC3) and the second (MBC2) modules of cryptographic transformations, which are the parts of the macroblock for blocking computer brute-force search of the receiving side (MBS), and the second input/output of the third module for cryptographic transformations (MBC3), which is a part of the macroblock for blocking computer brute-force search of the receiving side (MBS), are connected to the second output and the third input of the second module for cryptographic transformations (MBC2), which is a part of the macroblock for blocking computer brute-force search of the receiving side (MBS), the first output of the service information module (MSI) is connected to the input of the module for generating a set key of the transmitting side (MK1), the output of the latter module being connected to the second input of the first module for cryptographic transformations (MBC1), which is a part of the macroblock for blocking computer brute-force search of the receiving side (MBS), the second output of the service information module (MSI) is connected to the input of the module for generating a computed key of the transmitting/receiving side, where the first output of said module is connected to the fourth input of the module for cryptographic transformations (MBC2), which is a part of the macroblock for blocking computer brute-force search of the receiving side (MBS), the third output of said macroblock being connected to the second input of the module for generating a computed key of the transmitting/receiving side (MK2), the first input/output of the module for cryptographic calculations (MCC) of the transmitting side are connected, respectively, to the fifth input and the fourth output of the second module for cryptographic transformations (MBC2), which is a part of the macroblock for blocking computer brute-force search of the receiving side (MBS), the second input/output of the computer computing module (MCC) is connected, respectively, to the first input/output of the communication channel module of the transmitting side (CC), the second input/output of said module being intended for connection to the transmitting side via the communication channel (CC).

A feature of the proposed system is that the macroblock for blocking computer brute-force search of the transmitting side (MBS) comprises:
a module for generating "failure" (looping) matrices intended for their integration into the information signal;
a module for calculating the eigenvalues of "failure" matrices;

a module for generating information signals corresponding to the eigenvalues of the "failure" matrices and for "embedding" data into the information signal to be transmitted via communication channel, wherein the input of the module for generating the "failure" matrices is connected to the fourth output of the module for cryptographic calculations of the transmitting side, and the output of the module for generating "failure" matrices is connected to the input of the module for calculating the eigenvalues of "failure" matrices, the output of said module being connected to the input of the module for generating information signals, the output of the latter module is connected to the fifth input of the module for cryptographic calculations of the transmitting side.

Another feature of the proposed system is that the macroblock for blocking supercomputer brute-force search of the receiving side (MBS) comprises:

a module for generating "failure" (looping) matrices intended for their integration into the information signal;

a module for calculating the eigenvalues of "failure" matrices;

a module for generating information signals corresponding to the eigenvalues of the "failure" matrices and for "embedding" data into the information signal to be transmitted via communication channel, wherein the input of the module for generating the "failure" matrices is connected to the fourth output of the cryptographic computing unit of the receiving side, and the output of the module for generating "failure" matrices is connected to the input of the module for calculating the eigenvalues of "failure" matrices, the output of said module being connected to the input of the module for generating information signals, the output of the latter module is connected to the fifth input of the module for cryptographic calculations of the receiving side.

In the present invention, a module refers to a removable and replaceable element designed to perform a strictly defined function in the system.

The operation of MBS macroblocks is based on the use in encoding and decoding procedures of at least two independent secret keys based on matrix transformations, and at least two stages: the stage of solving a computational problem by using multi-step computing and the stage of information signals encoding, where the results of solving a computational problem obtained in the previous (first) stage are used. A complex of factors, in particular the design-related features of modern computers associated with a limited bit grid and extremely high sensitivity of the models used for encoding information to the variation of elements, together with the encoding technology used, result in the failure of automated (robotic) systems to perform procedures of multiple-times and multi-step "brute-force search" of the desired combinations using multiprocessor computer systems, which an unauthorized user has to utilize for decoding purposes. Nowadays, the presence of macroblocks (MBS) in the system makes automated (robotic) procedure for finding a solution to decode confidential information by an unauthorized user almost impossible, when said unauthorized user utilizes a procedure of multiple brute-force search of a secret key(s) value(s) even when using ultra-high productivity computer equipment, in particular, quantum computers.

During preparation of this application, in the process of the patent information research, the inventor has not found a design of system for encoded information transmission possessing the above set of essential features, which proves the compliance of the claimed technical solution with the "novelty" patentability criterion.

The technical result obtained as a result of the implementation of the present invention is the creation of conditions for "failure" (looping) of the computer system of an unauthorized user when the latter attempts unauthorized decoding of transmitted confidential information, thus, a stronger protection of confidential information against unauthorized access is provided.

The mentioned technical result is not revealed by the inventor in the known technical solutions of the prior art, therefore the proposed system for transmitting encoded information may be deemed to be compliant with the "inventive step" patentability criterion.

The proposed system for transmitting encoded information consists of structural components, which are manufactured using currently known technological methods, means and materials. It may be used to solve problems of information exchange between users of different spheres of business, society and management structures, and therefore it may be concluded that the proposed technical solution complies with "industrial applicability" patentability criterion.

Figure 1:
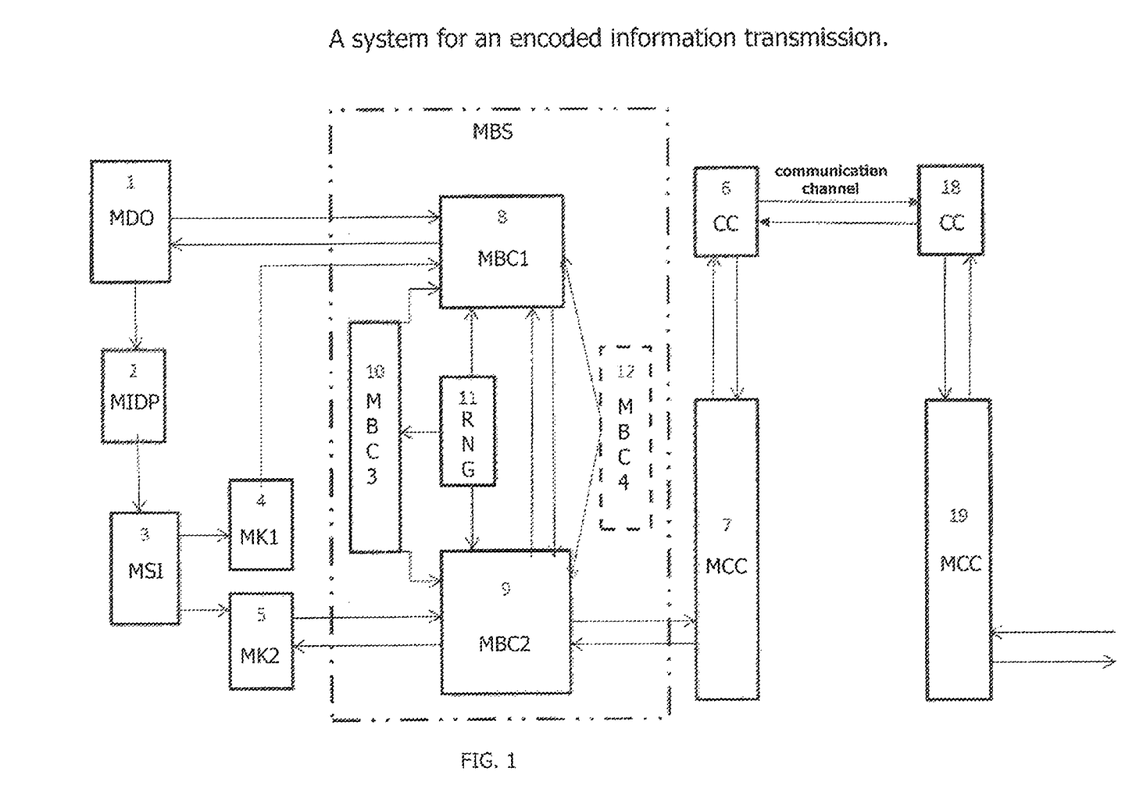
Figure 2:
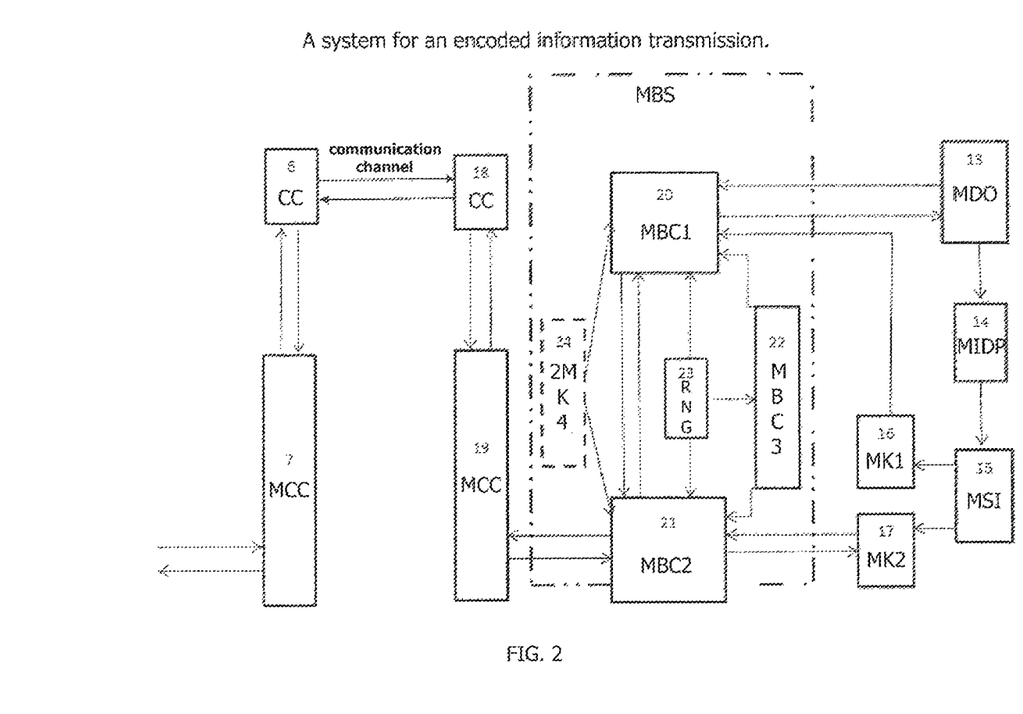

The essence of the invention is illustrated by the schematic drawings, where:

FIG. 1 shows a block diagram of the transmitting side of the proposed system for transmitting encoded information;

FIG. 2 shows a block diagram of the receiving side of the proposed system for transmitting encoded information.

The proposed system for transmitting encoded information comprises a transmitting side and a receiving side.

At the transmitting side the following modules are installed: for generating/displaying the output/received information of the transmitting side 1 (MDO), inputting a degree of the setting polynomial 2 (MIDP), service information 3 (MSI), generating a set key of the transmitting side 4 (MK1), generating a computed key of the transmitting/receiving side 5 (MK2), the transmitting side communication channel (CC), cryptographic computing 7 (MCC), and also the macroblock for blocking computer brute-force search of the transmitting side (MBS). Macroblock for blocking computer brute-force search of the transmitting side (MBS) comprises three modules for information encoding 8 (MBC1), 9 (MBC2), 10 (MBC3) and the random number generator 11 (RNG). Macroblock for blocking computer brute-force search of the transmitting side (MBS) may also comprise an additional module for information encoding 12 (MBC4).

In terms of the number, location and purpose of the modules, the receiving side mirrors the transmitting side. Modules similar to the corresponding modules of the transmitting side are installed at the receiving side, namely: for generating/displaying the output/received information of the receiving side 13 (MDO), inputting a degree of the setting polynomial 14 (MIDP), service information 15 (MSI), generating a set key of the receiving side 16 (MK1), generating a computed key of the transmitting/receiving side 17 (MK2), the receiving side communication channel 18 (CC), cryptographic computing 19 (MCC), and also the macroblock for blocking computer brute-force search of the receiving side (MBS). Macroblock for blocking computer brute-force search of the receiving side (MBS) comprises three modules for information encoding 20 (MBC1), 21 (MBC2), 22 (MBC3) and the random number generator 23 (RNG). Macroblock for blocking computer brute-force search of the transmitting side (MBS) may also comprise an additional module for information encoding 24 (MBC4).

At the transmitting side, the first input/output of the module 1 (MDO) of the transmitting side is connected, respectively, to the first output/input of the module 8 (MBC1) of the macroblock (MBS), the second output of the module 1 is connected to the input of the module 2 (MIDP), the output of said module being connected to the input of the module 3 (MSI), the first output of the latter being connected to the module 4 (MK1) input. The second output of the module 3 is connected to the module 5 (MK2) input. The module 4 output is connected to the second input of the module 8 (MBC1). The input/output of the module 5 (MK2) is connected, respectively, to the first output/input of the module 9 (MBC2) of the macroblock (MBS), the second input/output of the module 9 (MBC2) is connected, respectively, to the first output/input of the module 7 (MCC), the third input/output of the module 9 (MBC2) is connected, respectively, to the third output/input of the module 8 (MBC1), and the fourth inputs of the modules 8 (MBC1) and 9 (MBC2) are connected, respectively, to the first and second outputs of the random numbers generator 11 (RNG), the third output of the random numbers generator 11 is connected to the input of the module 10 (MBC3), the first and second outputs of said module being connected, respectively, to the fifth inputs of the modules 8 (MBC1) and 9 (MBC2). In case of supplementing the macroblock (MBS) with the fourth module 12 (MBC4), its outputs are connected, respectively, to the sixth inputs of modules 8 (MBC1) and 9 (MBC2). The second output/input of the module 7 (MCC) is connected to the first input/output of the module 6 (CC), the second input/output of said module being connected, via a communication channel, respectively, to the first input/output of the module 18 (CC) of the receiving side.

In the proposed system, the appropriate standard connectors and data buses are used for connection and data transmission between the modules.

Here, at the transmitting side, the first input/output of the module 13 (MDO) of the receiving side is connected, respectively, to the first output/input of the module 20 (MBC1) of the macroblock (MBS), the second output of the module 13 (MDO) is connected to the input of the module 14 (MIDP), the output of said module being connected to the input of the module 15 (MSI), the first output of the latter being connected to the module 16 (MK1) input. The second output of the module 15 is connected to the module 17 (MK2) input. The module 16 output is connected to the second input of the module 20 (MBC1). The first input/output of the module 21 (MK2) is connected, respectively, to the second output and the third input of the module 20 (MBC2) of the macroblock (MBS), the second input/output of the module 21 (MBC2) is connected, respectively, to the first output/input of the module 19 (MCC), the third input/output of the module 21 (MBC2) is connected, respectively, to the first output and the second input of the module 17 (MK2), and the fourth inputs of the modules 20 (MBC1) and 21 (MBC2) are connected, respectively, to the first and second outputs of the random numbers generator 23 (RNG), the third output of the generator 23 (RNG) is connected to the input of the module 22 (MBC3), the first and second outputs of said module being connected, respectively, to the fifth inputs of the modules 20 (MBC1) and 21 (MBC2). In case of supplementing the macroblock (MBS) with the fourth module 24 (MBC4), its outputs are connected, respectively, to the sixth inputs of modules 20 (MBC1) and 21 (MBC2). The second output/input of the module 19 (MCC) is connected to the first input/output of the module 18 (CC), the second input/output of said module being connected, via a communication channel, respectively, to the first output/input of the module 6 (CC) of the transmitting side.

Also, the macroblock for blocking supercomputer brute-force search of the transmitting side (MBS) comprises:
a module for generating "failure" (looping) matrices intended for their integration into the information signal (not shown);
a module for calculating the eigenvalues of "failure" matrices (not shown);
a module for generating information signals corresponding to the eigenvalues of the "failure" matrices and for "embedding" data into the information signal to be transmitted via communication channel (not shown);
wherein the input of the module for generating the "failure" matrices is intended to be connected to the fourth output of the module for cryptographic calculations of the transmitting side, and the output of the module for generating "failure" matrices is connected to the input of the module for calculating the eigenvalues of "failure" matrices, the output of said module being connected to the input of the module for generating information signals, the output of the latter module is connected to the fifth input of the module for cryptographic calculations of the transmitting side.

In addition to the above, the macroblock for blocking supercomputer brute-force search of the receiving side (MBS) comprises:
a module for generating "failure" (looping) matrices intended for their integration into the information signal (not shown);
a module for calculating the eigenvalues of "failure" matrices (not shown);
a module for generating information signals corresponding to the eigenvalues of the "failure" matrices and for "embedding" data into the information signal to be transmitted via communication channel (not shown);
wherein the input of the module for generating the "failure" matrices is intended to be connected to the fourth output of the cryptographic calculations unit of the receiving side, and the output of the module for generating "failure" matrices is connected to the input of the module for calculating the eigenvalues of "failure" matrices, the output of said module being connected to the input of the module for generating information signals, the output of the latter module is connected to the fifth input of the module for cryptographic calculations of the receiving side.

Modules 1 and 13 (MDO) may be a computer (gadget) at a workplace.

Modules 3 and 10 (MSI) may be a CHIP, i.e. software and hardware module containing technological parameters (service information) of the confidential communication mode corresponding to the embedded program and being used in the functioning of the modules 4 and 16 (MK1) for generating a set key and modules of cryptographic calculations 5 and 17 (MK2).

Modules 4 and 16 may be a CHIP, i.e. software and hardware module, which implements, in accordance with the embedded program, the transformation input thereto from the service information modules 3 and 15 (MSI) with the generation of an output digital sequence that determines the rules for processing information in the modules for cryptographic calculations 7 and 19 (MCC), respectively.

Modules 5 and 17 (MK2) may be a CHIP. i.e. software and hardware module that implements mathematical transformations corresponding to the embedded program for generation a computed key and being used in the operation of modules for cryptographic calculations 7 and 19 (MCC).

Modules 7 and 19 may be software and hardware modules, where digital sequences are input, respectively, from modules 1 and 13 (MDO) and modified sequences are output according to the embedded program.

The communication channel may be a standard communication channel allowing signal transmission between the transmitting side and the receiving side.

Modules 6 and 18 (CC) may be a standard modem. A type of said modem is selected depending on the interface and communication channel type.

The random number generator (RMS) may be a standard device that is commercially available and can perform this function.

Modules MBC1, MBC2, MBC3, MBC4 may be a system of chips, where each is able to implement mathematical transformations according to the embedded program, respectively, generation of "failure" (looping) matrices intended for their integration into the information signal (MDO module); calculation of eigenvalues of "failure" matrices (MBC1 module); generating information signals corresponding to the eigenvalues of the "failure" matrices and "embedding" data into the information signal (MBC2 module) to be transmitted via communication channel (CC).

For the operation of the proposed system for transmitting encoded information a software product is used such that it allows to create a rigid matrix (matrix of correspondence), where its certain real eigenvalues are identified by (correlated with) the values of information signals.

The proposed system may be implemented in three different modifications: a) with symmetric keys, b) with asymmetric keys and c) in a hybrid version, i.e. when one of the keys is symmetric and another key is asymmetric. The choice of the system modification does not breach or change the fundamental principles of its structure and operation.

In the case of selecting the option of encoding information using symmetric and asymmetric keys, the proposed system, without loss of generality regarding the other two modifications, operates as follows.

Preliminarily, the participants of the communication session agree in a strictly confidential mode, for example, during a meeting in person, the first of the keys, i.e. a digital sequence of binary signals, which will be further referred to as the "set key", and the second key, which will be calculated and may be changed according to an agreed algorithm from one session to another, and such key will be further referred to as the "computed key".

The "set key" is stored in modules 4, 16. The "computed key" is formed in modules 5, 17 and is subjected to mathematical transformations in modules 9 and 21. The "set key" defines the algorithm of permutation ("shuffling") of the elements used in modules 8 and 20, such elements being elements of the matrix and containing the information, which is input, respectively, into modules 8 and 20 from modules 1, 13 and is to be transmitted, while the "computed key" sets an initial value of the allowable error introduced into matrices used to increase the cryptographic stability of the algorithm. At the beginning of the communication session, the "set key" from modules 4 and 16 is transmitted, respectively, to modules 8 and 20. In modules 8 and 9, at the stage of information transmission from the transmitting side, cryptographic processing of information is performed, i.e. mathematical transformation of the transmitted information using "set" and "computed" keys. From module 9, the information arrives to the module 7, where it may be supplemented by some redundant information that complicates unauthorized decoding.

Next, the information from module 7, via module 6, which operates as a modem in the transmission mode, and the communication channel, is transmitted to the receiving side of the system. The information is received by module 18 of the receiving side, which operates as a modem in the receiving mode, and said information is pre-transformed therein. From module 18, the information is input to module 19 and then to modules 21 and 20, where its reverse cryptographic conversion takes place using the keys obtained by modules 16 and 17, and then the information is input to module 13, where digital information is converted into a form suitable for reading (or audio/video form). When transmitting information from the receiving side, all these actions are performed in the same order, using modules similar to the modules of the transmitting side.

Changing the parameters of the algorithms described below, in particular changing the dimension of the matrices used, allows communication session participants to dramatically increase the time required to "hack" each of the keys by an unauthorized user. However, the explosive growth of computation volume in case of unauthorized access is achieved by the following correlated use of both keys.

The initial information for organizing a communication session comprises: information binary series to be transmitted, a matrix, referred here as a "generating matrix", which is used to generate a set key, matrices (of the second order in the simplest case) corresponding to zero and one of the binary series, an allowable error coefficient and a corresponding matrix, referred here as a "matrix of a computed key", one (or more) eigenvalue(s) of said matrix being correlated with the allowable error coefficient, the second one forms the matrix required to encode the allowable error coefficient, such matrix, in the simplest case, may coincide with the first generating matrix.

The generating matrix(ces) is/are formed for the participants of the communication session, for example, by means of the random number generator (11, 23), and is/are stored a priori by both participants of the communication session. The dimension of such a matrix is set by the communication session participants depending on the desired level of security (the desired amount of computation in case of unauthorized decoding and, accordingly, the desired time during which the information will not be decoded by an unauthorized user).

In the algorithm for encoding procedure implementation two correlated stages may be identified: encoding using a set key and encoding using a computed key.

The main fragment of a communication session, describing the stages and physical implementation of the proposed solution, may be implemented, for example, as follows.

Let's consider that a binary series containing the information to be transmitted is generated at the transmitting side.

The first stage of the algorithm is encoding of the information using a set key and modules 4, 8, 9 and 16, 20, 21. The set key is generated based on the generating matrix according to an algorithm defined by both participants. For example, by numbering the elements of the generating matrix in ascending order. This sequence will be the set key.

Based on the set binary series, the transmitting side, using modules 5, 8, 9, 10, 11 and also using matrices of zero and one, generates a matrix referred here as an "information matrix". That is, the information matrix contains information to be transmitted and is built in accordance with a set sequence of zeros and ones of the information binary series and the location of information series elements in this matrix agreed by both participants of the communication session (preliminarily or as a result of information exchange between transmitting and receiving sides).

Using the computed key, the transmitting side, using modules 8, 9, 10 and 7, generates from the information matrix some false information matrix, where its elements are "distorted" using the computed key.

Further, using the set key, the transmitting side converts the false information matrix generated in the previous step into a "transport matrix" generated by way of permutation ("shuffling") of the false information matrix elements using modules 9 and 7. Thus, the transport matrix is formed based on both generating and false information matrices and is a set of false information matrix elements arranged in accordance with the set key, which is built on the basis of the generating matrix.

The second stage of encoding is encoding of the information using the computed key(s).

The simplest way to determine the computed key is to assign it by the transmitting side using modules 3, 5 with further its determination by the receiving side based on the information received from the transmitting side.

Using the module 10, the transmitting side arbitrarily generates a matrix such that its selected eigenvalue(s) determine(s) a number, referred here as the "allowable error coefficient".

In general, the computed key(s) is/are generated according to an algorithm a priori agreed by both participants of a communication session or determined by them in the process of data exchange, and such generation may be performed, for example, as follows.

One of the communication session participants provides an "allowable error coefficient", which is identified as the eigenvalue(s) of a matrix, referred here as a "transport matrix of the allowable error coefficient" (or determined using its eigenvalue(s)).

The allowable error coefficient limits the maximum allowable error that the transmitting side may introduce into the transport matrix elements so that they still may be identified by the receiving side according to their information values.

Similar to the first step, the transmitting side using, for example, the set key generates some false transport matrix of the computed key from the transport matrix of the computed key using modules 8, 9, 10 and 7.

The transmitting side transmits the false transport matrix of the computed key to the receiving side on the open communication channel.

The receiving side determines the allowable error coefficient from the received false transport matrix of the computed key, using the generating matrix.

The receiving side generates the transport matrix from the received false transport matrix using the allowable error coefficient determined in the previous step and using modules 19, 20, 21.

The receiving side generates the information matrix from the generated transport matrix, using the set key(s) by permutating its elements and using modules 19, 20, 21.

From the information matrix, the receiving side determines the binary series containing the information, which the transmitting side intends to transmit.

Thus, the participants of the communication session receive and transmit information using two independent keys, the first of these keys is determined a priori based on the information known to both sides or in the process of data exchange between the sides, and the second key is computed according to the algorithm agreed by both sides using modules 19, 20, 21 and the information transmitted on the open communication channel.

It is assumed that an unauthorized recipient of information has access to the open communication channel and has all the information transmitted on the open communication channel, and also s/he is aware of the described algorithm for information encoding (protection). It is assumed that the unauthorized user does not know all the other information available to authorized participants of the communication session.

In the proposed system, modules 8, 9, 10 and 20, 21, 22 provide a physical implementation of mathematical transformations corresponding to the described encoding steps.

The feature of the proposed system is that:
it implements interrelated procedures for generation and combined usage of the set and computed keys, where iterative transmission (transfer) of information between modules 8, 9 at the transmitting side and between modules 20, 21 at the receiving side is used in the process of encoding, thus achieving the effect of double exponential growth of amount of computations in case of attempted unauthorized decoding;
one-sided functions are selected for transformation of the information in the encoding modules 8 and 20, an example of such functions is the function of determining the roots of a characteristic equation, where the solution of the inverse problem is a number or set of numbers that is/are an element(s) of a fuzzy set. This allows a generation and, additionally, according to the agreement of participants of a communication session, double use of encryption keys: not only as elements of fuzzy sets, but also as exact numerical values.

An unauthorized user having access to an open communication channel may have a false transport matrix of the information signal and a false transport matrix of the allowable error coefficient. To determine the allowable error coefficient, an unauthorized user must consistently (in the absence of heuristic provisions) consider possible permutations of the elements of the matrix obtained from the communication channel and determine eigenvalue(s) for each combination (matrix). It is assumed, for example, that the first eigenvalue determines the allowable error coefficient, and this is known to the receiving side, the transmitting side and the unauthorized user. As discussed above, authorized participants of a communication session may exponentially increase the number of permutations and the amount of computations necessary to determine their eigenvalues by increasing the dimensions of the matrices used.

In this case, with each calculated allowable error coefficient, the unauthorized user has to solve the problem of determining the information matrix from the false transport matrix. Also, as in the first case, by increasing the dimensions of the matrices used, the authorized participants of the communication session may exponentially increase the number of possible permutations and, accordingly, the amount of computations required for "hacking".

Thus, the combination of both encoding steps in one encoding procedure provides a double exponential effect of increasing the amount of computation required for unauthorized decoding of the transmitted information. The numerical value of the "explosive" effect of increasing the amount of computation, which is achieved through the correlated use of both keys, depends on the dimension of the matrices used.

The advantage of the proposed solution is that an unauthorized user attempting to decode information (during unauthorized access) has to solve characteristic equations of arbitrarily high order multiple times.

The order of a characteristic equation is determined by the dimension of the matrices used, which, in turn, is set by the participants of the communication session. It is known that equations of the order higher than the fourth order have no analytical solution and may be solved only by numerical methods. For an authorized user it is enough to generate and solve the characteristic equation once using the secret key (s). The number of problems of determining the roots of the characteristic equation to be solved for decoding information in case of unauthorized access increases exponentially with increasing dimension of the matrices used by authorized participants in the communication session. In this case, an unauthorized user (cryptanalyst) spends additional computing resources and, accordingly, time for unauthorized access to information in order to generate characteristic equations corresponding to all possible matrices determined by permutation of numbers (matrix elements) available to all participants of the communication session, including the unauthorized user.

In the simplest case, the second key, i.e. the allowable error coefficient, may not be calculated, but rather used by participants of the communication session as a priori specified. The advantage of the proposed solution is that, in case of an unauthorized access, the computation of the second key is associated with multiple big amount of computations compared to the amount of computations that should be performed by the receiving side. Thus, aperiodic changes (according to a pre-agreed algorithm) of the allowable error coefficient result in a significant increase of the time required for unauthorized decoding of transmitted information.

The increase in the amount of computation due to the correlated use of both keys may be generally assessed as increasing the amount of computation required to "hack" each of the keys, which are considered independently, with increasing dimension of the matrices used: unauthorized decoding of the information encoded in the first stage, i.e. when using only the generating matrix and, accordingly, the set key, without error introduction, is possible by brute-force searching for all possible permutations of the matrices elements.

To decode the information encoded in the second stage, i.e. to determine the allowable error coefficient, as a separate task, an unauthorized user must repeatedly solve the characteristic equation of a given big dimension. For certainty, we assume that eigenvalues of matrices are determined by solving systems of differential equations corresponding to the matrices used.

Macroblocks (MBS) perform the function of applying the results of calculations of eigenvalues of matrices, which are used in the process of crypto protection of original information, as a basis for restarting the procedure of determining matrices eigenvalues, but with other matrices (referred here as "second level" matrices) generated using results of calculations performed in the previous stages. Here, macroblocks (MBS) enable generation of the "second level" matrices, i.e. matrices generated using the numbers, as separate elements, calculated at the previous stages. i.e. the steps of determining the eigenvalues of the matrices generated in accordance with the above encoding scheme (see International application for the invention PCT/PCT/UA 2016/000064 of May 25, 2016).

In the system for information transmission, adding more units (MBS) provides the following effect associated with the arranging of standard computing processes in modern computer systems: an unauthorized user using an automated mode and data available to him/her, for example, data received from an open communication channel and containing some error resulted from calculations performed on matrices of a given class due to their mathematical specifics associated with the appearance of errors, will receive a solution that is significantly different from the desired one.

Let's consider operation of macroblocks (MBS) 13 and 14 using the following example, where second order matrices are used for decoding, as the simplest case. The secret information is stored in a matrix $$\bar{A} = \begin{matrix} -100001 & 100000 \\ 100010 & -100100 \end{matrix}.$$

As a result of the actions performed by the transmitting side, an unauthorized user will receive a matrix ?, for example, as follows $$? = \begin{matrix} -990000 & 950000 \\ 100010 & -100100 \end{matrix}.$$

An unauthorized user may perform the process of unauthorized decoding in the automated mode, by sequentially changing the elements of the matrix A and analyzing the results. In order to calculate the eigenvalues of the matrix A (?) an unauthorized user must perform numerical integration of a system of differential equations:

$$X = Ax.$$

This system is a rigid one and it is extremely sensitive to variations of the matrix A elements. Or, if we consider the Cauchy problem, the solution will be extremely sensitive to changes in the initial conditions of integration. Without limiting the generality, as an example, we consider the case of elements variations in the matrices used.

Since matrix A is essentially rigid, due to the specifics of numerical integration of differential equations systems with this class of matrices, the calculation step is significantly limited. It is known that attempts to increase the integration step cause distortion of the solution and give results that differ significantly from the exact solution, which does not allow to correctly determine the transmitted information within an acceptable number of steps in the process of unauthorized decoding.

On the other hand, in order to find the desired solution, which is the basis for encoding transmitted messages, without significantly increasing the integration step, an unauthorized user must perform calculations with a small step, which ensures that the computational process does not go beyond the numerical stability range of the method (algorithm) used. In this case, an unauthorized user must perform an extremely large number of steps associated with the length of the integration interval. Since all computers (computing systems) used perform calculations taking into account the limited bit grid, performing an extremely large number of steps results in accumulation of computational error associated with the finiteness of the bit grid. Thus, the solution obtained by an unauthorized user at the end of the integration interval will be different from the sought one. Accordingly, in case of unauthorized decoding in automated mode, when searching for a solution with a limited step that ensures stability of the selected numerical algorithm, as well as in case of increasing the step, it is impossible to correctly determine the transmitted information, if set-up additional macroblocks (MBS) of the transmitting side and the receiving side are used in the system for transmitting information.

When parameters of additional macroblocks (MBS) are set up correctly, the use of specialized (problem-oriented) methods for calculating rigid systems of differential equations by an unauthorized user in order to increase the step also does not result in obtaining the true value of transmitted information by the unauthorized user, because relaxation of restrictions concerning the step value in most cases is associated with an increase in the total amount of computation, i.e. gives rise to the problem of decoding described in the above paragraph. A purposeful and correct choice of technological parameters of the process of encoding and transmission of confidential information between authorized participants of a communication session may be based on the system described in details in the international application for the invention PCT/UA 2016/000064 of May 25, 2016 [Publication WO/2017/146669, date of publication Aug. 31, 2017].

In particular, due to defining restrictions as to the allowable accuracy of the obtained solution during its identification, it is impossible to decode the information correctly by an unauthorized user, even when using specialized (problem-oriented) methods.

Variation of the used (obtained from the transmission channel) data by an unauthorized user, i.e. "brute-force search of variants", does not allow him/her to receive the desired solution due to specifics of the chosen mathematical tools, the used class of matrices and the technological scheme of macroblocks (MBS) functioning, resulting in the necessity for an unauthorized user to perform a much larger number of integration steps, which is associated with the accumulation of computational error, and thus the numerical values obtained by an unauthorized user do not match the needed ones.

If the participants of the communication session choose the technological parameters of the communication session (dimension of the matrices used, the degree of their rigidity, etc.) taking into account certain specifications of technical means that potentially may be used by an unauthorized user to decode information, the appropriate choice of the above technological parameters of the communication session makes unauthorized decoding using a certain class of computer systems fundamentally impossible.

Procedures for determining elements of the "second level" matrices and implementing the technology of intended "failure" or "looping", which is based on the introduction of repeated operation of calculating the eigenvalues of matrices used with generation of the "second level" matrices in macroblocks (MBS) may be implemented with or without transmission of matrices or calculated eigenvalues (or other data correlated therewith) on the communication channel to the second participant of the communication session and back. However, the solution, which involves transmitting of the signals to another participant of the communication session on the communication channel, such signals being generated based on solution of differential equations system or otherwise found eigenvalues in order to implement the "failure" function, is more general and allows to consider the implementation of the "failure" function without transmission of additional signals on the communication channel as a special case.

In order to determine the correlation between the technological parameters of the communication session and the specifications (technical characteristics) of the computer equipment that may potentially be used for unauthorized access attempts, while the protection should be provided against such attempts, when setting up macroblocks (MBS), authorized participants of the communication session may estimate the value of the maximum accumulated error:

$$\Delta = \varepsilon * n$$

where $\varepsilon$ is the error caused by the limited bit grid of the computer system; n is the number of steps.

The feature and advantage of the disclosed solution is that the use of supercomputer (quantum computer) facilities for unauthorized decoding of information, i.e. brute-force search in multimillion (multibillion) combinations within reasonable time, ceases to be effective and does not provide decoding of confidential information, as it is possible to do in other information transmission systems using known encoding algorithms, when the complexity of solving the decoding problem is associated mainly with a large amount of computation/brute-force search for possible combinations and the time needed to solve such problem, respectively, is determined by the capacity (performance) of multiprocessor computing complex (supercomputer, quantum computer) used.

It should be noted that due to supplementing the information transmission system with macroblocks (MBS), the number of combinations to be considered by an unauthorized user as well as the amount of computations associated with attempts of unauthorized access to information are extremely high, because the unauthorized user has to consider all possible combinations of elements used to generate matrices and also different variations of each of the elements of the matrices used.

An authorized participant of the communication session is protected from computational problems created by macroblocks (MBS) for an unauthorized user, because in the proposed system the technological solutions described in details in the prototype system are used [International application for the invention PCT/UA 2016/000064 of May 25, 2016; Publication WO/2017/146669, Publication date Aug. 31, 2017].

Thus, the proposed system for confidential information transmission makes it possible to significantly complicate the process of decoding the transmitted information for an unauthorized user, even if s/he operates super high-performance computing systems, by way of creating conditions for "failure" (looping) of the computing process in the proposed system, when automated unauthorized decoding of transmitted confidential information is attempted.

LIST OF ITEMS IN THE SCHEMATIC DRAWINGS

1—module for generating/displaying the output/received information of the transmitting side (MDO),
2—module for inputting a degree of the setting polynomial of the transmitting side (MIDP),
3—module of service information of the transmitting side (MSI),
4—module for generating a set key of the transmitting side (MK1),
5—module for generating a computed key of the transmitting/receiving side (MK2),
6—module of transmitting side communication channel (CC),
7—module for cryptographic calculations of the transmitting side (MCC),
8, 9, 10—modules for information encoding of the transmitting side, respectively (MBC1, MBC2, MBC3), 11—random number generator of the transmitting side (RNG), 12—additional module for information encoding of the transmitting side (MBC4), 13—module for generating/displaying the output/received information of the receiving side (MDO), 14—module for inputting a degree of the setting polynomial of the receiving side (MIDP), 15—module of service information of the receiving side (MSI), 16—module for generating a set key of the receiving side (MK1), 17—module for generating a computed key of the transmitting/receiving side (MK2), 18—module of receiving side communication channel (CC), 19—module for cryptographic calculations of the receiving side (MCC), 20, 21, 22—modules for information encoding of the receiving side, respectively (MBC1, MBC2, MBC3), 23—random number generator of the receiving side (RNG), 24—additional module for information encoding of the receiving side (MBC4).

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A system for an encoded information transmission in a computer (gadget), said system comprising a transmitting side and a receiving side of the computer (gadget), wherein the transmitting side comprises a plurality of transmitting side combined software and hardware modules for generating/displaying output/received information of the transmitting side, cryptographic calculations of the transmitting side, and service information of the transmitting side; for generating a set key of the transmitting side; for generating a computed key of the transmitting/receiving side; for transmitting side communication channel, and the receiving side comprises a plurality of receiving side combined software and hardware modules: for generating/displaying the output/received information of the receiving side, cryptographic calculations of the receiving side, and service information of the receiving side; for generating a set key of the receiving side; for generating a computed key of the transmitting/receiving side; for receiving side communication channel, characterized in that the system additionally comprises, at the transmitting side and the receiving sides respectively, macroblocks for blocking computer brute-force search of the transmitting side (MBS) and for blocking computer brute-force search of the receiving side (MBS), such that each of said macroblocks at the transmitting side and the receiving side comprises a system of at least three modules for information encoding/cryptographic transformations (MBC1, MBC2, MBC3), a module for random numbers generation (RNG), and modules for inputting a degree of the setting polynomial (MIDP), wherein the transmitting side comprises said plurality of transmitting side software and hardware modules for: generating/displaying the output/received information of the transmitting side (MDO), inputting a degree of the setting polynomial (MIDP), service information of the transmitting side (MSI), generating a set key of the transmitting side (MK1), generating a computed key of the transmitting/receiving side (MK2), the transmitting side communication channel (CC), cryptographic computing (MCC); and also the macroblock for blocking computer brute-force search of the transmitting side (MBS), said macroblock comprising the at least three modules for information encoding (a transmitting side MBC1 module including software and hardware), (a transmitting side MBC2 module including software and hardware), (a transmitting MBC3 module including software and hardware) and the random number generator (RNG), and the receiving side comprises said plurality of receiving side software and hardware modules for: generating/displaying the output/received information of the receiving side (MDO), inputting a degree of the setting polynomial (MIDP), service information (MSI), generating a set key of the receiving side (MK1), generating a computed key of the transmitting/receiving side (MK2), the receiving side communication channel (CC), cryptographic computing (MCC); and also the macroblock for blocking computer brute-force search of the receiving side (MBS), said macroblock comprising the at least three modules for information encoding (a receiving side MBC1 module including software and hardware), (a receiving side MBC2 module including software and hardware), (a receiving side MBC3 module including software and hardware) and the random number generator (RNG), wherein, at the transmitting side, a first input/output of the transmitting side MDO module of the transmitting side is connected, respectively, to a first output/input of the transmitting side MBC1 module of the transmitting side MBS macroblock, and a second output of the module is connected to the input of transmitting side MIDP module, an output of said transmitting side module being connected to an input of an a transmitting side MSI module, a first output of the transmitting side MSI module being connected to a transmitting side MK1 module output, a second output of the a transmitting MSI module is connected to a transmitting side MK2 module input, the transmitting side MK1 module output is connected to second input of the transmitting side MBC1 module, the input/output of the transmitting side MK2 module is connected, respectively, to first output/input of the transmitting side MBC2 module of the transmitting side MBS macroblock, a second input/output of the transmitting side MBC2 module is connected, respectively, to a first output/input of a transmitting side MCC module, a third input/output of the transmitting side MBC2 module is connected, respectively, to the third output/input of the transmitting side MBC1 module, and fourth inputs of each of the transmitting side MBC1 and MBC2 modules are connected, respectively, to first and second outputs of a transmitting side RNG generator, a third output of said transmitting side RNG generator being connected to a transmitting side MBC3 module input, the first and second outputs of the being connected, respectively, to fifth inputs of each of the transmitting side MBC1 and MBC2 modules, a second output/input of the transmitting side MCC module is connected to a first input/output of a transmitting side CC module, a second input/output of said transmitting side CC module being connected, via a communication channel, respectively, to a first input/output of a receiving side CC module of the receiving side, where a input/output of the receiving side MDO module of the receiving side is connected, respectively, to a first output/input of the receiving side MBC1 module of the receiving side MBS macroblock, and a second output of the receiving side MDO module is connected to an input of the a receiving side MIDP module, an output of said receiving side MIDP module being connected to an input of a receiving side MSI module, a first output of the receiving side MSI module being connected to an input of the receiving side MK1 module, a second output of said receiving side MSI module being connected to an input of a receiving side MK2 module an input/output of the receiving side MK2 module is connected, respectively, to a first output/input of a receiving side MBC2 module of the receiving side MBS macroblock, a second input/output of receiving side MBC2 module is connected, respectively, to a first output/input of a receiving side MCC module, a third input/output of the receiving side MBC2 module is connected, respectively, to a third output/input of a receiving side MBC1 module, and fourth inputs of the receiving side MBC1 and MBC2 modules are connected, respectively, to first and second outputs of the receiving side RNG generator, a third output of the receiving side RNG generator is connected to the input of a receiving side MBC3 module, first and second outputs of said receiving side MBC3 module being connected, respectively, to fifth inputs of the receiving side MBC1 and MBC2 modules, second output/input of the receiving side MCC module is connected to the first output/input of receiving side CC module, second input/output of said receiving side CC module being connected, via the communication channel, respectively, to the first input/output of the transmitting side CC module of the transmitting side.

\* \* \* \* \*